United States Patent [19]

Ichiyanagi et al.

[11] 4,310,130
[45] Jan. 12, 1982

[54] METHOD AND APPARATUS FOR TAKING UP TAPE

[75] Inventors: Takashi Ichiyanagi, Hirakata; Kiyokazu Imanishi, Higashiosaka; Hidetoshi Kawa, Ibaraki; Katsuyuki Yamamoto, Katano, all of Japan

[73] Assignee: Matsushita Electric Industrial Co., Ltd., Osaka, Japan

[21] Appl. No.: 127,529

[22] Filed: Mar. 5, 1980

[30] Foreign Application Priority Data

Mar. 9, 1979 [JP] Japan .................................. 54-28098

[51] Int. Cl.³ .......................... G03B 1/04; G11B 15/58
[52] U.S. Cl. ...................................... 242/179; 242/182
[58] Field of Search ........................ 242/179, 182–185, 242/71.7, 71.8; 308/3.5; 226/95, 97; 360/132; 34/23, 155; 271/98

[56] References Cited

U.S. PATENT DOCUMENTS

| | | | |
|---|---|---|---|
| 2,188,377 | 1/1940 | Small | 242/71.7 |
| 2,239,188 | 4/1941 | Boes | 242/71.7 |
| 3,134,527 | 5/1964 | Willis | 226/97 |
| 3,398,913 | 8/1968 | Orlando | 242/71.8 |
| 4,054,331 | 10/1977 | Jamin | 308/3.5 |

*Primary Examiner*—Leonard D. Christian
*Attorney, Agent, or Firm*—Burgess, Ryan and Wayne

[57] ABSTRACT

A tape for a magnetic tape recorder or the like is taken up while the barometric pressure around the part of the take-up reel where the tape is being wound is kept below atmospheric pressure. The tape can thus be taken up in a stable manner at a high speed, by eliminating the tape floating force which is the basic cause of irregular take-up phenomenon.

7 Claims, 15 Drawing Figures

METHOD AND APPARATUS FOR TAKING UP TAPE

BACKGROUND OF THE INVENTION:

The present invention relates to a method and an apparatus for taking up the tape of magnetic tape recorder or the like.

In taking up tape at high speed, a small clearance is formed between the take-up reel and the tape. The surrounding air is enfolded in this space as the tape travels and the reel rotates, generating a floating force on the tape. Further, the tape is oscillated in its lateral direction due to irregularities such as vibrations of the various mechanical parts and variation in the tape tension due to eccentric rotation of the reels. The surface defined by the top edge of the wound tape, or the coil face is thus made irregular, resulting in the so-called irregular take-up phenomenon of the tape.

When the tape is wound irregularly, its appearance is poor, and undesirable magnetic traces are formed on the tape, resulting in frequent generation of reading or recording errors by the magnetic reading or recording head.

In order to solve these problems, it has been conventional practice to press the tape in the vicinity of the take-up part with a side roll so as to regulate the tape take-up, thereby eliminating the lateral irregularity of the tape. However, in this method, since the roller and the tape directly contact each other, the edge of the tape is disadvantageously damaged. Dropout may also occur due to the circulation and adhesion of dust. Still further, the benefit of known means of eliminating irregular take-up of the tape disappear at take-up speeds over 5-6 m/sec. Thus, high speed take-up has been impossible. Although it is possible to increase the tape speed limit, at which the winding irregularity begins, by increasing the tape tension, this is not desirable since it leads to separation and degradation of the magnetic layer of the magnetic tape.

SUMMARY OF THE INVENTION:

The object of the present invention is to provide a method and an apparatus for eliminating irregular winding of tape due to the enfolding of air at the tape take-up part, while enabling high speed winding in a take-up device for tape-shaped materials such as magnetic tapes.

In the present invention, air pressure around the tape take-up part is kept at less than atmospheric pressure. This prevents the enfolding of air between the take-up reel and the tape.

The features and effects of the present invention will become more apparent from the following description taken in conjunction with the accompanying drawings.

Figure 1:
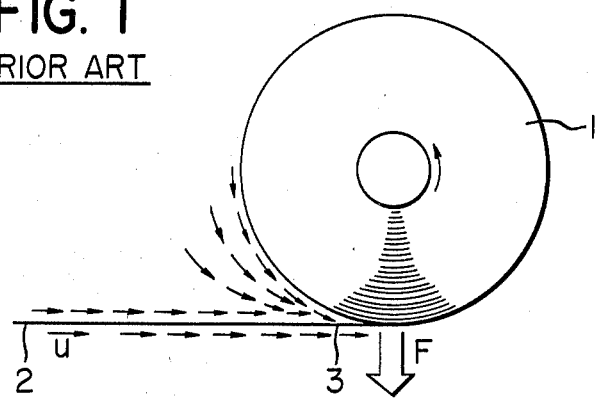
FIG. 1 illustrates the irregular take-up phenomenon in a conventional winding method.

DETAILED DESCRIPTION OF THE PRIOR ART:

Referring to the irregular winding phenomenon, air surrounding the tape being wound is enfolded in a small clearance 3 formed between a take-up reel 1 and a tape 2 as the tape travels and the reel rotates. A floating force F is then generated (shown by a thick arrow in the drawings) in the tape 2 by an air layer caused by wedge layer or throttle layer effects as defined in fluid lubrication theory. Further, irregular factors, such as mechanical vibrations of the various parts and variations in the tape tension due to eccectric rotation of the reel, lead to lateral oscillation of the tape. The coil face of the tape thus becomes irregular.

Figure 2:
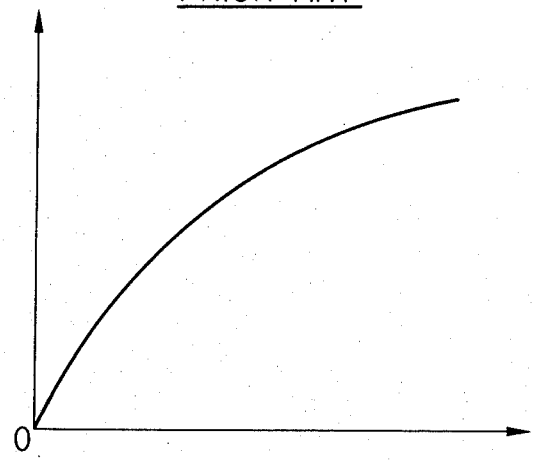
FIG. 2 illustrates the relation between the tape floating force and the tape speed in the method shown in FIG. 1.

FIG. 2 shows the relation between the floating force F, which is generated by the enfolding of the air and is the main factor for the irregular winding phenomenon, and the tape travel speed U. It is shown in this figure that the tape floating force increases with an increase in the tape travel speed, suggesting mechanism similar to an active pressure air bearing. It may be assumed that irregular winding is an important factor which interferes with high speed winding of the tape.

Figure 3:
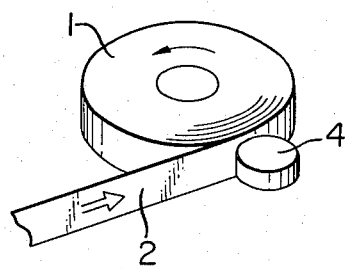
FIGS. 3 and 4 show conventional approaches for eliminating irregular winding of the tape.

Conventionally, the following methods have been practiced in order to eliminate the irregular winding phenomenon:

(1) As shown in FIG. 3, the tape 2 is pressed from the outside toward the take-up reel 1 by a pressing roller 4 in the vicinity of the take-up part, for preventing the floating of the tape.

Figure 4:
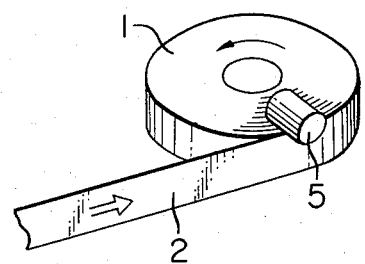

(2) As shown in FIG. 4, the edge of the tape 2 is regulated by a side roller 5 in the vicinity of the take-up part for eliminating lateral irregularity in the wound tape.

However, it has been already pointed out that these methods are ineffective for sufficiently preventing the irregular winding phenomenon.

Figure 5:
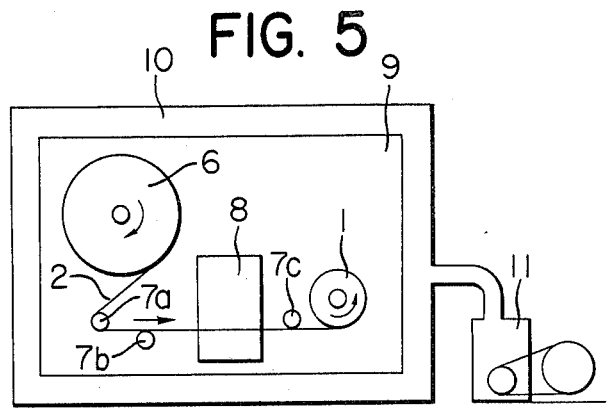
FIG. 5 is a schematic view illustrating an embodiment of the tape take-up method of the present invention.

DESCRIPTION OF THE PREFERRED EMBODIMENTS:

FIG. 5 shows an embodiment of a tape take-up device applying the method of the present invention. A tape 2 is supplied from a supply side 6 and travels along each travel guide 7a, 7b, and 7c. The tape 2 is taken up by a take-up reel 1 through a processing part 8 for cutting or adhesion. A take-up device 9, as a whole, is disposed within a sealed container 10. The barometric pressure in the sealed container is reduced to below atmospheric pressure by a vacuum pump 11.

Next, a principle for enabling high speed winding and eliminating the irregular winding phenomenon by this method is described which comprises taking up the tape under reduced pressure.

It has already been suggested that the irregular winding phenomenon is caused by a kind of active pressure air bearing action due to the enfolding of air at the tape take-up part. The generation of the pressure of the active pressure air bearing depends upon the viscosity of the air. As the viscosity increases, the generated pressure increases. According to the kinetic theory of gases, the viscosity of a gas does not change when its pressure is reduced. However, in the case of compressible fluids such as air, the generated pressure decreases as the surrounding barometric pressure decreases, due to the non-linear nature of the pressure generation mechanism.

Figure 6:
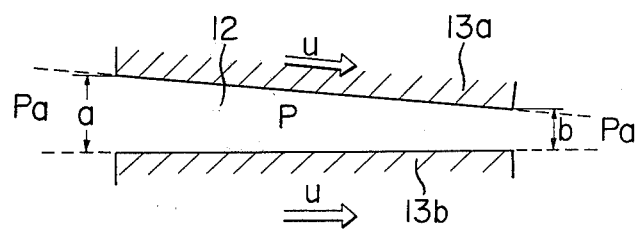
FIG. 6 is a view illustrating a tape take-up part for a model analysis of the irregular winding phenomenon.
Figure 7:
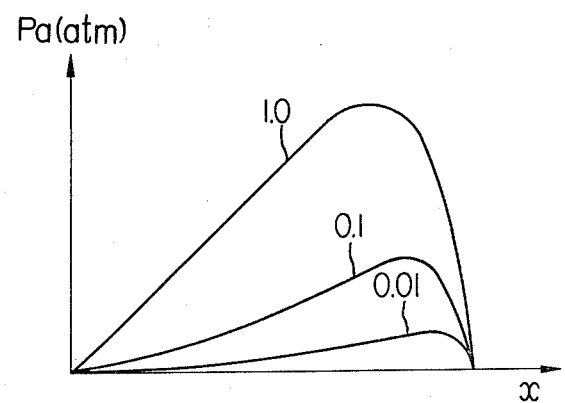
FIG. 7 is a graph showing, by model analysis, the relation between the pressures within the inlet and the outlet clearances of the tape take-up part.
Figure 8:
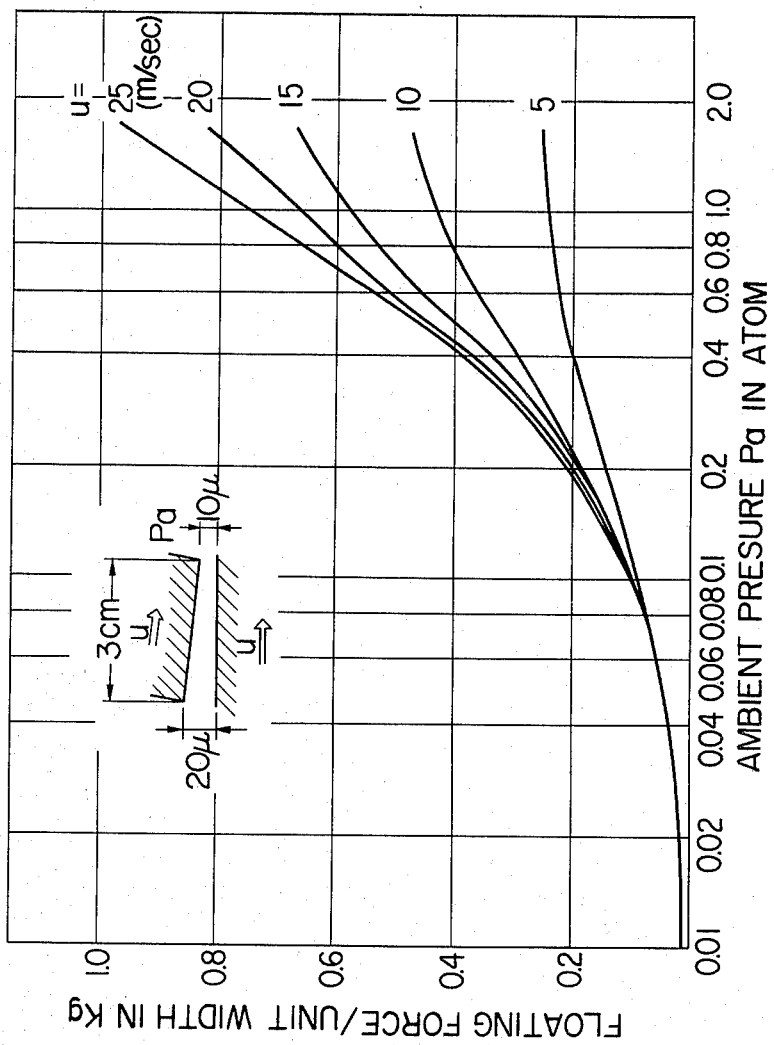
FIG. 8 shows, by model analysis, the relation between the ambient pressure and the generated floating force, taking the tape speed U as a parameter.

The tape take-up part is modeled in FIG. 6. When two planes 13a and 13b of infinite width move at the speed U in the directions shown by the arrows, they define a small tapered clearance 12 such that the inlet side clearance a is greater than the outlet side clearance b. The variation of the pressure P generated in the clearance in relation to the ambient pressure Pa may be calculated as a function of distance from the inlet side clearance a by the finite difference method as a compressive fluid lubrication problem. As a result, it was found that the generated pressure decreases as the ambient pressure Pa decreases. FIG. 8 shows the relation between the ambient pressure and the generated floating force calculated by integrating the pressure distribution shown in FIG. 7, taking the speed U as a parameter.

It is seen from FIG. 8, that the floating force per unit length in the lateral direction decreases as the ambient pressure decreases, and that it is not much affected by the speed U when the ambient pressure is below 0.1 atm.

The above results are obtained by simple calculations using the model. In the case of an actual tape take-up part, the tape width, the tape tension, the bending rigidity, and so on are involved, complicating the matter. However, in principle it is obvious that the floating force decreases as the ambient pressure is reduced.

Figure 9:
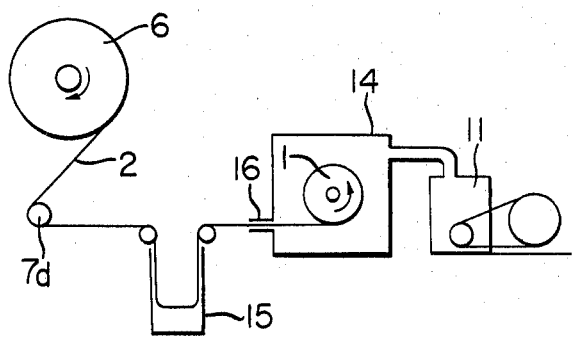
FIG. 9 is a schematic view illustrating an embodiment of a tape take-up device with a reduced pressure chamber at the tape take-up part.

As shown in FIG. 9, in a take-up device with a reduced pressure chamber at its take-up reel part, an experiment was conducted to take up the tape on a reel with its flange removed. The conditions were such that the magnetic tape was 12.7 mm (½ inch) in width and 20 μin thickness, and the tape tension was equal to the tension produced by a 50 g weight. When the pressure in the reduced pressure chamber was at atmospheric pressure, the coil face of the wound tape was irregular (the irregularities were on the order of 1 mm). When the take-up speed was 6-7 m/sec, it was impossible to take up the tape on the take-up reel, as the tape bounced out of the guide path.

When the pressure in the reduced pressure chamber was on the order of 50 Torr (approximately 1/15 atm), the coil faces of the wound tape were extremely smooth, even when the tape was wound at a high speed. When the irregularities of the end faces of the tape were measured by a surface smoothness measuring meter, the irregularity of each layer of the wound tape was about 0.04 mm at maximum. Further, when the press roller or the side roller shown in FIGS. 3 and 4 was used, it was possible to take-up the tape extremely smoothly.

When the tape wound under atmospheric pressure and that wound under reduced pressure were compared, the layers of the tape wound under reduced pressure did not slip easily and were not easily disturbed by vibrations or shocks.

Based on this principle, the present invention makes it possible to take up the tape at a high speed in a stable manner by reducing the pressure in the vicinity of the tape take-up part to below atmospheric pressure, thereby eliminating the tape floating force which is the major cause of irregular winding of the tape.

In particular, when the pressure around the take-up part is kept below 0.3 atm, it is possible to take up the tape at a higher speed than that attainable in the case of take-up under atmospheric pressure, as may be seen from FIG. 8. As the surrounding barometric pressure is reduced, the generated floating force decreases. However, below the order of $1 \times 10^{-4}$ Torr, it is not much more effective and it is, moreover, undesirable in terms of the time and effort necessary for exhausting the gas.

In the embodiment shown in FIG. 9, a reduced pressure chamber 14 is disposed in the vicinity of the take-up reel part. It is necessary, in this case, to dispose a sealing member at a tape inlet 16 for introducing the tape into the reduced pressure chamber, so as to prevent the outside air from flowing into the reduced pressure chamber.

Figure 10:
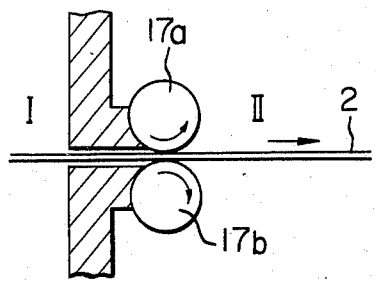
FIGS. 10 through 15 show embodiments of a sealing mechanism for sealing the atmospheric pressure side I and the reduced pressure chamber side II of the take-up device of FIG. 9.

This sealing means may take various forms. In the embodiment shown in FIG. 10, two pinch rollers 17a and 17b are pressed to both faces of the tape 2, so as to form a seal between the atmospheric pressure side I and the reduced pressure chamber side II.

Figure 11:
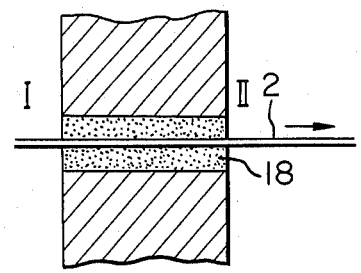

In the embodiment shown in FIG. 11, the inflow of air is prevented by disposing a soft material, such as sponge rubber or a cleaner tape, in the space between the path at the tape inlet and the tape path wall.

Figure 12:
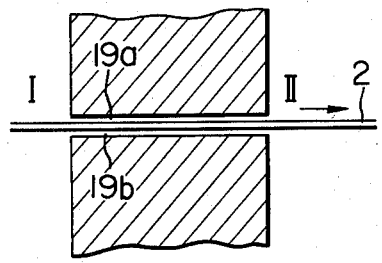
Figure 13:
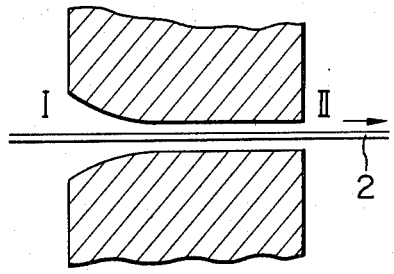
Figure 14:
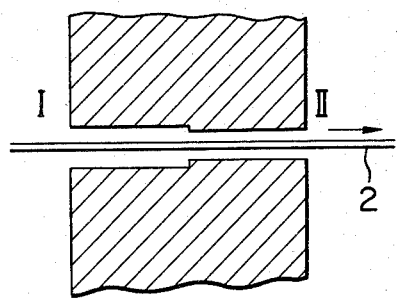

Since damage to the tape surface leads to drop out in the case of magnetic tapes, it is preferable to seal them without any direct contact. Simple non-contact sealing may be achieved, as shown in FIG. 12, by forming a slit-shaped path with a clearance 10–100μ greater than the thickness of the tape. That is, small clearances 19a and 19b of 5–50μ are formed at both sides of the tape, thereby blocking the flow of the gas by its viscosity. When the tape travels in such a narrow path, the travel position of the tape varies due to various outside factors, so that the path wall and the tape may contact each other disadvantageously. In this case, as shown in FIGS. 13 and 14, the clearance of the tape path in the direction of the tape is increased at the atmospheric pressure side I and gradually decreased toward the reduced pressure chamber side II (FIG. 13), or the path is narrowed in a stepped form (FIG. 14). Thus, the tape travel position is controlled so that the tape may be introduced into the reduced pressure chamber in a stable manner. This is achieved by static pressure bearing effects called step throttle or surface throttle effects, and by the active pressure bearing effects generated as the tape travels.

Figure 15:
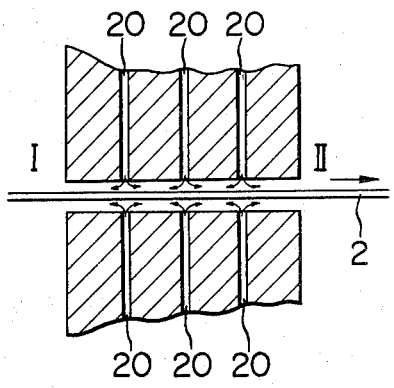

As shown in FIG. 15, it is also possible to form more than one pair of openings (20) on opposite wall faces of the tape path, through which is blown air toward both sides of the tape, to constitute an opposing type static pressure bearing on both faces.

What is claimed is:

1. A method for taking up a tape on a take-up reel mounted on a spindle from a supply reel mounted on a spindle by driving said spindles and disposing said supply reel, said take-up reel and a tape transport passage therebetween in gas-tightly sealed enclosure, evacuating the gases in said enclosure by means of an evacuating means such as a vacuum pump to a reduced pressure of from 0.3 to 0.0001 atm, and taking up the tape on said take-up reel at high velocity in a thin atmosphere which is maintained at said reduced pressure of from 0.3 to 0.0001 atm.

2. An apparatus for taking up a tape from a supply reel on a take-up reel mounted on a spindle which is coupled to a drive means, comprising a depressurized chamber with a tape inlet port formed through one wall thereof, a gas evacuating means for evacuating said chamber to and maintaining said chamber at a pressure in the range of 0.3 to 0.0001 atm., and a drive shaft for rotating said spindle, whereby the tape which has been guided through said tape inlet port into said depressurized chamber is taken up on said take-up reel while the pressure in said depressurized chamber is reduced to and maintained at from 0.3 to 0.0001 atm.

3. An apparatus as set forth in claim 2, further comprising an air-tight sealing means comprising one or more rotatable cylindrical body pairs each adapted to clamp the tape between the cylindrical surfaces thereof so that as the tape is transported through the tape inlet port, it makes surface and rolling contact with said cylindrical body pairs, whereby the flow of air entrained by the traveling tape from the atmospheric pressure side opening of said tape inlet port into the depressurized chamber along the surfaces of the tape is essentially prevented.

4. An apparatus as set forth in claim 2, further comprising an air-tight sealing means comprising soft material members made of sponge rubber or cleaner tape secured to the opposing walls of said tape inlet port in opposed relationship with the surfaces, respectively, of the tape transported through said tape inlet port so that the tape is brought into contact with said soft material members while being guided into said depressurized chamber and the flow of the air entrained by the traveling tape from the atmospheric pressure side opening of said tape inlet port along the surfaces of the tape into said depressurized chamber is essentially prevented by said soft material members.

5. An apparatus as set forth in claim 2, wherein said tape inlet port is in the form of a slit having a height exceeding the thickness of the tape by from 10 to 100 microns; and said tape inlet port is provided with a viscous resistance sealing means adapted to prevent the flow of air entrained by the tape from the atmospheric pressure side opening of said tape inlet port into said depressurized chamber.

6. An apparatus as set forth in claim 2, wherein said tape inlet port is in the form of a slit having a height exceeding the thickness of the tape by from 10 to 100 microns; further comprising opposing type static air bearings comprising air jets discharging at or above atmospheric pressure through one or more air discharge nozzle pairs disposed in opposing wall surfaces of said tape inlet port and directed against respective opposed major surfaces of the tape being transported, so that the tape can be transported along a center plane equidistant from said opposing wall surfaces of said tape inlet port without being brought into contact therewith, and so that a noncontacting sealing means is thus formed which prevents the flow of air entrained by the traveling tape from the atmospheric pressure side of said tape inlet port to said depressurized chamber along the surfaces of the tape by viscous resistance encountered by the air.

7. An apparatus as set forth in claim 2, wherein said tape inlet port is in the form of a slit whose height is greater than the thickness of the tape by from 10 to 100 microns; and said tape inlet port is provided with reducing type static air bearings communicating with the surrounding atmosphere and which are formed by gradual or stepwise reduction of the cross-section of said tape inlet port, said inlet port being symmetrical about the center cross-sectional plane at the midpoint of the opening of said tape inlet port, so that the tape can be transported along the center plane equally spaced apart from the opposing wall surfaces of said tape inlet port, said wall surfaces being in opposed relationship with the major surfaces of the tape being transported without being made in contact therewith, so that a noncontacting sealing means is formed which prevents the flow of air entrained by the traveling tape from the atmospheric pressure side opening of said tape inlet port to said depressurized chamber along the surfaces of the tape by viscous resistance encountered by the air.

* * * * *

UNITED STATES PATENT AND TRADEMARK OFFICE
CERTIFICATE OF CORRECTION

PATENT NO. : 4,310,130

DATED : January 12, 1982

INVENTOR(S) : Takashi Ichiyanagi, et al

It is certified that error appears in the above—identified patent and that said Letters Patent is hereby corrected as shown below:

Column 4, line 13: "$1 \times 10^{314}$ Torr" should be --$1 \times 10^{-4}$ atm--.

Figure 8, bottom line: "Presure" should be --Pressure--.

Signed and Sealed this

Twenty-fifth Day of January 1983

[SEAL]

Attest:

Attesting Officer

GERALD J. MOSSINGHOFF

Commissioner of Patents and Trademarks